United States Patent [19]
Wessel et al.

[11] Patent Number: 4,852,658
[45] Date of Patent: Aug. 1, 1989

[54] MOUNTED EDGER

[76] Inventors: Lloyd E. Wessel, 2810 Meadow Dr.; Edward O. Wessel, 3116 Cawein Way, both of Louisville, Ky. 40220

[21] Appl. No.: 64,519

[22] Filed: Jun. 22, 1987

[51] Int. Cl.$^4$ ............................................. A01D 34/84
[52] U.S. Cl. ....................................... 172/14; 56/16.9; 56/17.2; 172/17
[58] Field of Search ....................... 56/16.9, 17.2, 261, 56/251; 172/13, 14, 15, 16, 17

[56] References Cited

U.S. PATENT DOCUMENTS

| | | |
|---|---|---|
| 117,485 | 7/1871 | Tournier . |
| 819,176 | 5/1906 | Secrest .................................. 172/14 |
| 1,010,260 | 11/1911 | Hill . |
| 1,065,946 | 7/1913 | Janson . |
| 1,127,764 | 2/1915 | Huck . |
| 1,181,281 | 5/1916 | Albert . |
| 1,561,823 | 11/1925 | Bishop . |
| 1,654,574 | 1/1928 | Brown . |
| 1,720,169 | 7/1929 | Cripe . |
| 1,732,308 | 10/1929 | Livingston . |
| 1,763,339 | 6/1930 | Beck . |
| 1,770,434 | 7/1930 | Schleicher . |
| 2,270,649 | 1/1942 | Corley . |
| 2,483,935 | 10/1949 | Ridenour . |
| 2,506,366 | 5/1950 | Korn . |
| 2,525,944 | 10/1950 | Ralston . |
| 2,608,043 | 8/1952 | Berdan . |
| 2,663,137 | 12/1953 | Asbury . |
| 2,682,825 | 7/1954 | Warholoski . |
| 2,686,364 | 8/1954 | Arnoldy . |
| 2,707,858 | 5/1955 | Norton et al. . |
| 2,718,838 | 9/1955 | Schumacker . |
| 2,725,813 | 12/1955 | Stoeber . |
| 2,752,841 | 7/1956 | Laplante ................................ 172/14 |
| 2,791,875 | 5/1957 | Faas . |
| 2,901,878 | 9/1959 | Johnson . |
| 2,906,080 | 9/1959 | Light, Sr. . |
| 3,003,301 | 10/1961 | Koon . |
| 3,019,844 | 2/1962 | Key . |
| 3,053,035 | 9/1962 | Earley . |
| 3,057,411 | 10/1962 | Carlton . |
| 3,097,703 | 7/1963 | Alvik . |
| 3,123,964 | 10/1964 | Schwartz . |
| 3,125,165 | 3/1964 | Boudreaux et al. . |
| 3,130,793 | 4/1964 | Allegretti . |
| 3,150,720 | 9/1964 | Hartnett . |
| 3,192,693 | 7/1965 | Bergeson . |
| 3,322,201 | 5/1967 | Ballister ................................ 172/14 |
| 3,346,053 | 10/1967 | Allegretti . |
| 3,357,497 | 12/1967 | Simolka . |
| 3,404,520 | 10/1968 | Doliten et al. . |
| 3,421,300 | 1/1969 | Rhodes . |
| 3,475,887 | 11/1969 | Price . |
| 3,489,225 | 1/1970 | Bass . |
| 3,668,845 | 6/1972 | Parker . |
| 3,690,384 | 9/1972 | Patterson . |
| 3,710,563 | 1/1973 | Polette ................................. 56/16.9 |
| 3,734,196 | 5/1973 | Mangun . |
| 3,907,039 | 9/1975 | Remley et al. . |
| 3,907,040 | 9/1975 | trusty . |
| 4,170,099 | 10/1979 | Owens . |
| 4,200,155 | 4/1980 | Mullet et al. . |
| 4,318,267 | 3/1982 | Green . |
| 4,321,785 | 3/1982 | Kaland ................................. 56/17.2 |
| 4,413,467 | 11/1983 | Arizpe . |
| 4,453,372 | 6/1984 | Remer . |
| 4,464,544 | 8/1984 | Carsello et al. . |
| 4,478,028 | 10/1984 | Dawson, Jr. . |
| 4,551,967 | 11/1985 | Murcko . |
| 4,589,252 | 5/1986 | Williams . |
| 4,642,976 | 2/1987 | Owens . |

OTHER PUBLICATIONS

"Kwik-Edge", Brochure—4 pages.
Toro Brochure Form No. 490-4504-C (1982).

*Primary Examiner*—Richard J. Johnson
*Attorney, Agent, or Firm*—Wood, Herron & Evans

[57] ABSTRACT

A circular edging disk is mounted on the axle assembly of a lawn mower for adjustment between a raised, stowed position and a deployed turf edging position. Adjustment of the mower with respect to the mower wheels does not affect the disposition of the edging disk relative to the turf.

7 Claims, 3 Drawing Sheets

MOUNTED EDGER

This invention relates to lawn edgers and more particularly to an improved, mower-mounted edger.

In our prior patent applications Ser. No. 865,624, filed May 21, 1986 and Ser. No. 889,813, filed July 24, 1986, we disclose improved mower-mounted edgers which are mounted to mower decks via hinged joints. These edgers can be moved into retracted positions where they do not interfere with the close-in mowing capacity of the mowers. In another of our prior applications, Ser. No. 06/890,068, filed July 24, 1986, we disclose an articulated edger mount secured to the front center area of a mower deck and supporting an edger either in front of, or to either side of, the mower.

While these edgers have certain particular uses and advantages as described in these applications, we have now invented a new and improved edger providing still further advantages and improved ease of use.

One of the important features for a mowermounted edger to possess is the capability to edge turf adjacent a mowed area up to the edge of an upstanding obstacle such as a step, wall, curb or the like. The side mounted edgers of our prior applications Ser. Nos. 865,624 and 889,813 could only edge up to a position spaced rearwardly from the front of the mower, depending on their mounting location. This left unedged a foot or two of turf, in the case of a walk-behind mower, or even more, in the case of a tractor-mounted mower just in front of any such obstacle.

Also, it will be appreciated that running our previous side-mounted, or side-disposed, edgers through turf adjacent a paved area generated asymmetric forces offsetting straight-line stability of the mower.

Accordingly, it has been one objective of this invention to provide an improved, mounted edger capable of edging up to an upstanding forward obstacle.

Another objective of the invention has been to provide an edger which reduces disruption of the straight-line stability of the mower on which the edger is mounted.

In our prior applications, the disposition of the deck mounted edgers was affected by the of the mower's cutting height. That is, when the mower wheels were adjusted relative to the mower deck to vary the mower cutting height, the edger was also adjusted relative to the wheels, and to any turf, pavement or other support surface, and its maximum available depth of cut was thus varied. While the prior edgers could themselves be adjusted, it has been an objective of this invention to provide a mower-mounted edger which is not affected by relative adjustment between the mower and its wheels for normal mowing height adjustment.

In our prior applications, the disposition of the edger from its stored or retracted position to its operative position was at least a multiple step operation. The edger first had to be deployed, and the cutting depth of the edger then had to be set. It is, accordingly, a further objective of the invention to provide an edger of simple operation between its inoperable or stowed position and its operable position.

Finally, it will be appreciated that the edger disk of our invention herein is preferably sharp and that it is desirable to provide sufficient shrouding when the edger is both in and out of use, while still providing the other advantages sought.

To these ends a preferred embodiment of our invention generally includes, but is not limited to, a sharpened circular edging disk adjustably mounted on a rotationally restrained axle assembly of the front wheel of a lawnmower, preferably on the same side of the mower as any side discharge chute thereon. A positively indexing edger height-adjusting apparatus is operably secured to the outer end of the non-rotatable mower wheel axle. The edger is disposed in the same generally vertical plane, whether indexed in one of several lower positions to edge or in a higher, inoperative position. It is only necessary to positively adjust the edger height relative to the wheel axle in order to initiate edging. Preferably, the axis of the disk is disposed vertically beneath the axle of the mower wheel when the disk is in its deepest edging position.

Typically, the mower's front wheel extends forwardly of the mower housing. Depending on the relative diameters of the mower wheel and the sharpened disc, and the adjustment of the disc relative to the wheel, the edger is capable of edging up to an obstacle engaged by the front wheel.

This edger is not effected by any adjustment of the position of the front wheel with respect to the mower deck for normal grass mowing height adjustment. The reference point for the edger is the front wheel axle and not the mower deck as it was in our prior applications mentioned above. The mower can thus be set to either its highest or lowest grass-cutting position while the edger remains in the same position with respect to the wheel axle on which it is mounted, and with respect to any turf or pavement on which the wheel rides. Edger position is thus not affected by mower height adjustments.

We have discovered that this wheel axle mounting of the edger tends to improve the straightline stability of the mower, as compared to our prior deck mounted edgers.

Deployment of the edger is simple, since it is only necessary to operate the edger height adjustment apparatus to drop the sharpened disk into the turf.

The preferred embodiment of our edger further includes a two-piece shroud, with each piece rotationally mounted on the disk axis. A first outer shroud of semicircular shape extends above the upper half circumference of the disk, and a rotatable semicircular second outer shroud covers the lower half of the disk. When it is desired to edge, the second shroud is rotated about the disk axis to a position generally co-extensive with, and internally of, the first shroud. This uncovers the lower half of the disk for edging. Accordingly, the disk is protected at all times whether or not the edger is raised or lowered, but its sharp circumference is readily available for edging by a simple rotation of one part of the shroud.

These and other advantages will become readily apparent from the following detailed description of a preferred embodiment and from the drawings in which.

It is to be appreciated that our invention contemplates the combination of a lawn edger with wheeled lawn care apparatus, for cutting or edging turf along and between, for example, the edge of a lawn and a sidewalk, street, or curbing. While various types of lawn care apparatus could be used in combination with our edger, the preferred embodiment of our invention includes a wheeled lawnmower on which an edger is mounted as particularly described herein. The lawnmower is preferably of the rotary type and can be pushed or self-propelled by either rear or front wheel propulsion means.

Figure 4:
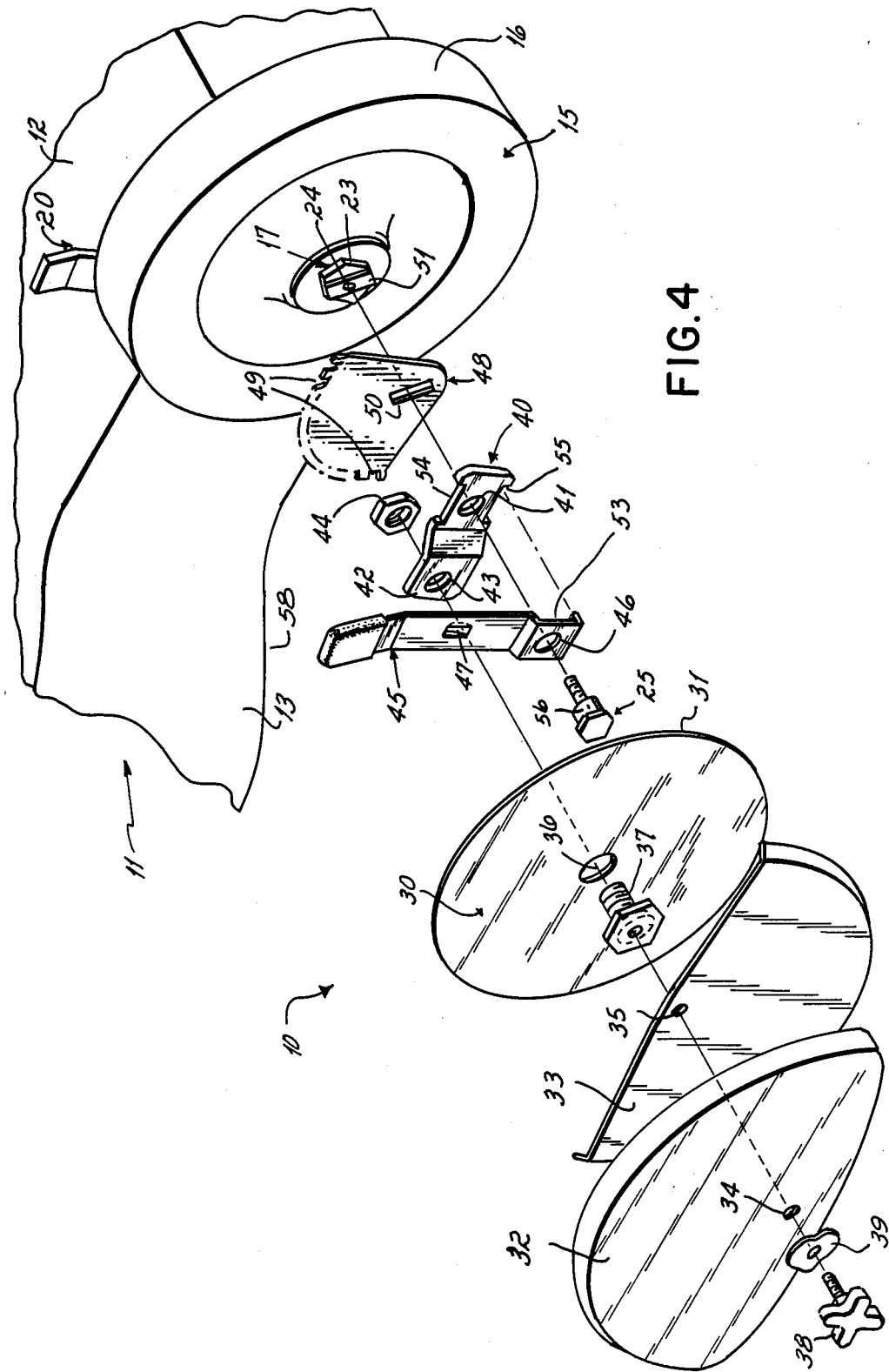
FIG. 4 is an exploded perspective view of the invention as in FIG. 1.

Turning first to FIG. 4, there is shown therein an exploded view of the elements of our invention which provide an improved turf edging apparatus 10. A lawnmower 11 includes a deck 12 having a bulged area 13 for accommodating a horizontally rotating blade of any typical form (not shown). If the lawnmower 12 is a side discharge type, the edging apparatus as will be described herein is preferably mounted on the same side of the mower as the side discharge chute thereof.

Figure 1:
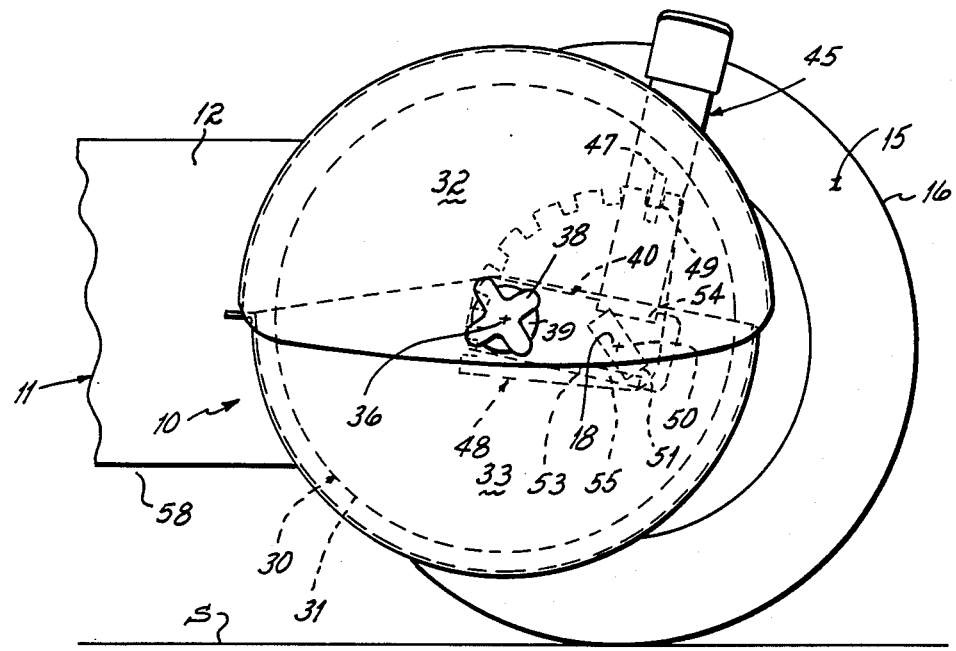
FIG. 1 is a side elevational view of the invention shown in raised or stowed position adjacent the right front wheel of a mower.
Figure 2:
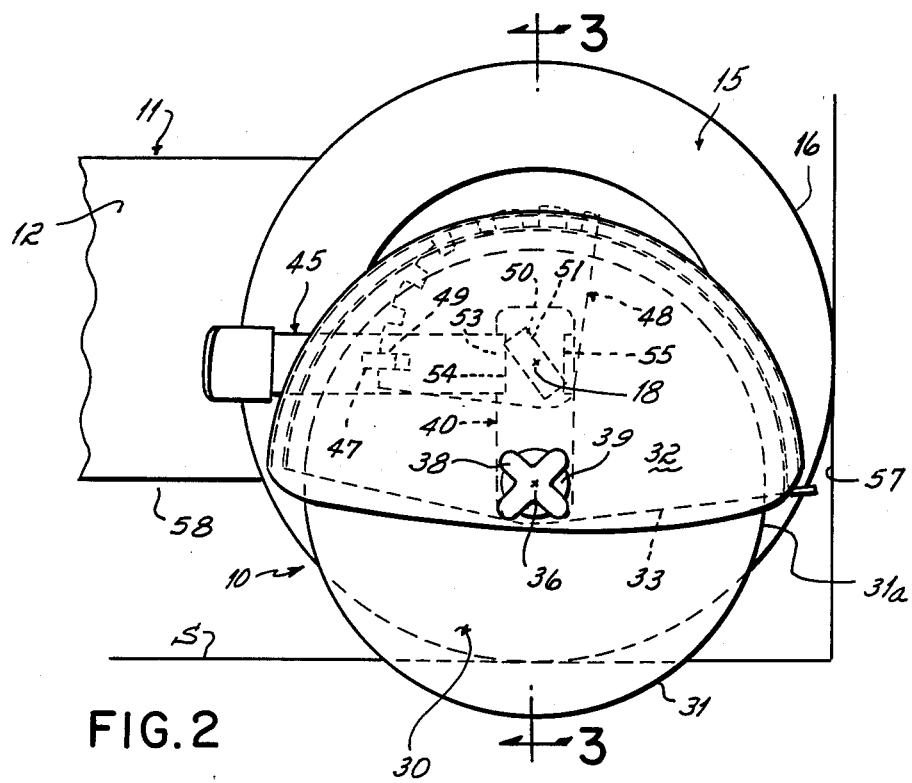
FIG. 2 is a view similar to FIG. 1 but showing the edger in a deployed position for edging near an upstanding obstacle.

For purposes of this description, the figures show an edging apparatus mounted on the right hand side of a mower 12. The lawnmower 11 includes a front wheel 15 having a circular or circumferential tread surface 16 for rolling along a ground surface S (FIGS. 1 and 2). Ground surface S, of course, includes either a turf or a pavement area such as a sidewalk or street, for example.

If the mower 11 is a front wheel drive mower, it can be driven by engagement of the tread 16 with a drive cog (not shown). Otherwise the mower could be rear wheel driven or simply pushed.

Figure 3:
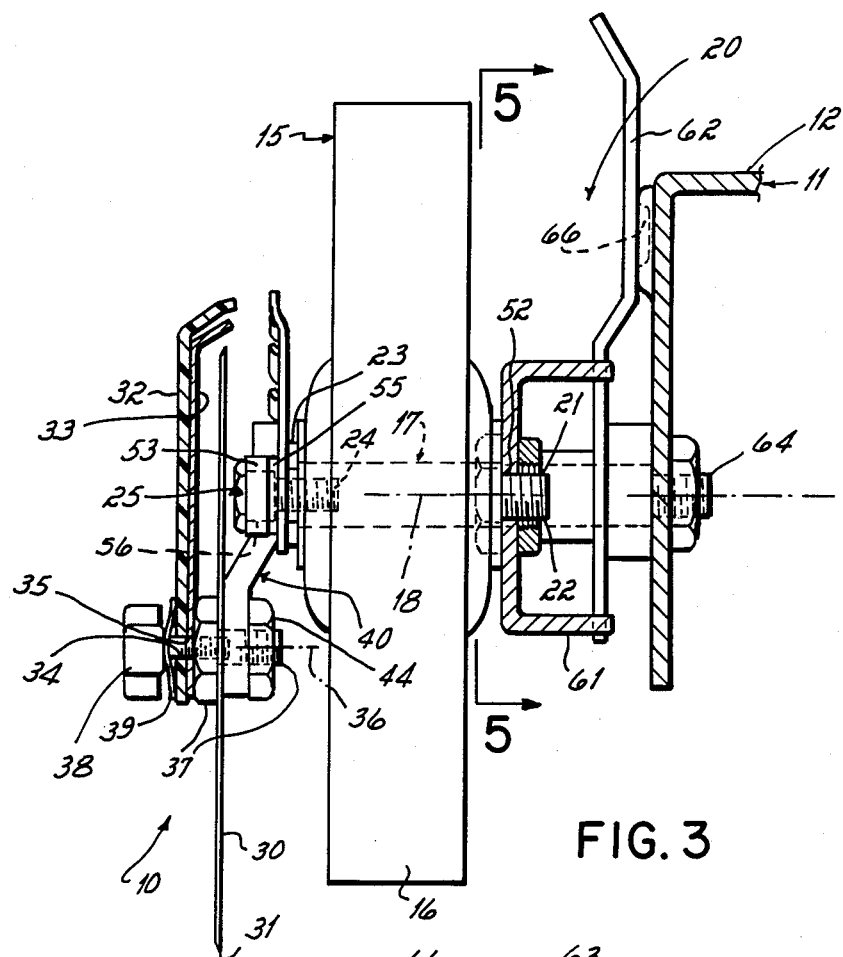
FIG. 3 is a cross-sectional view taken along lines 3—3 of FIG. 2.
Figure 5:
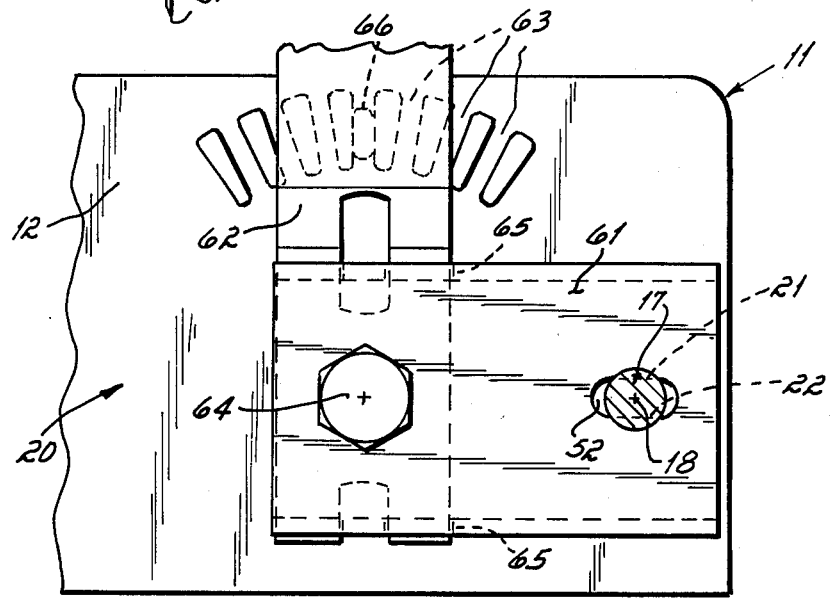
FIG. 5 is a cross-sectional view taken along lines 5—5 of FIG. 3.

As perhaps best shown in FIG. 3, the wheel 15 is mounted on the mower 12 at a forward portion thereof by means of an axle 17 having an axle axis 18 (as also shown in FIGS. 1 and 2). While FIGS. 3 and 5 show the wheel 15 mounted to a wheel height adjusting mechanism 20, it is also feasible to mount the wheel and axle 17 directly to the deck 12 of a mower 11. Wheel height adjusting mechanism 20 in FIG. 5 can be of any suitable type and is preferably of the lever operable type which is commonly known. Operation of the wheel height adjusting mechanism 20 described below is operable to change the vertical disposition of the axle 17 of the wheel with respect to the mower deck 12. Such adjustment does not change the disposition of the wheel 15 or axle 17 with respect to a ground surface S, for example. Operation of the wheel height adjustment mechanism 20 does serve to raise and lower the deck of the mower 12 with respect to wheel 15 for adjustment of the grass cutting height.

It will be appreciated that the axle 17 is provided with flats 21 and 22 (FIG. 3) on opposite sides thereof for the purpose of securing the axle 17 against any rotation with respect to the height adjusting mechanism 20 and hence the mower. The axle 17 is provided with a head 23 having an internally threaded bore 24 for receipt of a bolt 25. Bolt 25 is thus extended into the axle 17 for the purpose of mounting the adjustable edger disk apparatus 10 to the axle 17.

The edger itself includes a rotatable circular edging disk 30 having a sharp, circular circumferential turf cutting edge 31. First and second shroud members 32 and 33 are each provided with mounting bores 34 and 35, respectively, by which the shrouds 32, 33 can be rotationally mounted about a disk axis 36. Disk axis 36 is spaced from, but parallel to, wheel axis 18. The shrouds 32, 33 are secured to a disk mounting bolt 37 by means of a thumb screw 38 and a belleville washer 39 for the purpose of adjusting the frictional tension holding the shrouds 32, 33 in place. Thumb screw 38 is threaded into the bolt 37 for this purpose.

In order to mount the disk 30 for movement about the axle 17, an adjustment apparatus is provided as best seen perhaps in FIGS. 3 and 4. This mechanism includes a mounting arm 40 having a mounting bore 41 for receipt of the bolt 25 on the axis 18 of the axle 17. The arm has an opposite end 42 provided with a bore 43 for receipt of the bolt 37 which is secured through the disk 30 and the arm 42 by means of a nut 44.

An adjusting arm 45 is provided with a bore 46 for receiving the bolt 25. Adjusting arm 45 is also provided with a detent 47. A positioning plate 48 is provided with a plurality of grooves 49 for receiving the detent 47. Plate 48 is also provided with an elongated slot 50 for receiving a cooperatively shaped boss 51 provided integrally on the head 23 of the axle 17. When the axle 17 is secured to the height adjusting mechanism 20 or the mower 12 it is held against rotation thereby by means of the flats 21, 22 and a similarly shaped slot such as the slot 52 in the height adjusting mechanism 20 or the mower deck 12. The plate 48 is thus held against rotation about the axis 18 by means of the axle 17 and the cooperation between the slot 50 and the boss 51.

The adjusting arm 45 is also provided with a lower end having a shaped relieved area 53 engaging relieved areas 54 and 55 of the arm 40. Bolt 25 is provided with a shoulder 56 which extends through the adjusting arm 45 and the mounting arm 40 and permits rotation of those two elements with respect to the axle 17 and with respect to the positioning plate 48.

The arm 45 is slightly yieldable so that the detent 47 can be retracted from any of the grooves 49 and the arm 45 pivoted about the axis 18 and the axle 17. This motion also moves the disk axis 36 in a circular direction about the axle 17 and about the axis 18. Accordingly, the disk axis 36 and the disk is movable radially about the axle 17. Also, it will be appreciated that the disk is positively indexed and held by this apparatus in a selected position for edging at a predetermined depth.

Any suitable mower height adjusting apparatus may be employed in combination with the edger apparatus 10, however one such particular height adjusting apparatus 20 has been shown in FIGS. 3 and 5. The apparatus 20 includes a bracket 61, an operating lever 62 and a plurality of locking notches or detent 63. The lever 62 is secured to the bracket 61 and the entire assembly is secured to the deck 12 by a bolt 64 which rotatably mounts the arm 62 and bracket 61 thereto. The arm 62 is secured for movement with bracket 61 by means of relieved areas 65 in the bracket 61 in which arm 62 fits. The axle 17 of the mower wheel is disposed at an opposite end of bracket 61 from bolt 64. When the top end of arm 62 is moved to the left (FIG. 3), a projection 66 on arm 62 is released from the detent 63 and the arm, with bracket 61 moving therewith, can be rotated to raise or lower axle 17 and wheel 15 with respect to the mower deck.

Returning now momentarily to FIG. 1, the edger is shown in a stowed position with respect to the mower deck 12. In this position, it will be appreciated that the disk 30 is completely covered by the outer first shroud 32 and inner second shroud 33 and that the axis 36 of the disk is located rearwardly, with respect to the mower deck 12 and the wheel 15 on axle 17. In this position, the detent 47 of arm 45 is located in a forward groove 49 of the positioning plate 48. It will also be appreciated that a lower portion of the turf cutting edge 31 of disk 30 is spaced above the ground surface S.

Turning now to FIG. 2, the edger is shown in a deployed position. In this position, it will be appreciated that the edger axis 36 is spaced substantially vertically beneath the wheel axis 18 and the axle 17. In this position, it will be seen that the arm 45 has been rotated rearwardly and downwardly so that the detent 47 is positioned and has been positively indexed in a rearwardmost groove 49. In this position, the mounting arm 40 has been rotated through slightly more than 90°.

In addition, it will be appreciated that the second shroud 33 has been rotated around the axis 36 to a position internally of the first shroud 32. This position is also shown in FIG. 3. Accordingly, in a preferred embodiment it will be seen in FIG. 2 that the second shroud has been rotated to a position which is substantially coextensive with the first shroud 32. Of course, the shrouds could be differently dimensioned with the first shroud, for example, extending circumferentially about the disk 30 more than 180° and the second shroud therefore being somewhat less. Accordingly, it is not necessary that the second shroud be coextensive with the first shroud and it is not believed to be necessary that the second shroud is either internally of or externally of the first shroud. However, it will be appreciated that the provision of the two shrouds permit overall protection of the entire circumferential sharp edge of the disk when it is in a stowed position as shown in FIG. 1, and yet the shroud can be adjusted to uncover and expose a sharpened edge 31 of the disk for edging such as shown in FIG. 2.

In the deployed position of FIG. 2, it will be appreciated that a forward portion 31a of the edge 31 is located approximate the forwardmost disposition of the wheel tread 16. Accordingly, when the mower is run up to an upstanding obstacle, such as step 57, as the edger is being used the edger is operative to a position proximate the step 57, leaving only a very small amount of uncut turf between the edger and step. The very small amount of uncut turf is typically small enough to be easily pulled by hand or otherwise cut.

It will also be appreciated that in the deployed position as shown in FIG. 2 the disc 30 is disposed below the surface S so that its cutting edge 31 lies and is held beneath that surface in a positively indexed position to cut to a predetermined depth any grass or turf extending over any pavement such as a sidewalk, for example. Any adjustment of the mower deck 12 so as to adjust the grass cutting height of the mower will not effect the disposition of the edger disk 31. As perhaps best seen in FIG. 2, the edger disk 31 is mounted for rotation about the axis 36 and the distance between axis 36 and the wheel axle 17 and its axis 18 remains constant for all positions of the disk whether in a stowed or deployed condition. Any relative movement between the mower deck 12 and the wheel 15 by virtue of the height adjustment apparatus 20 will not disturb the relationship of the disk 30 with respect to the axle 17.

Moreover, it will also be appreciated as shown in FIG. 3 that the edger disk 31 is mounted relatively closely to the wheel 15 and does not protrude so far outwardly thereof as to present any obstacle or hazard. Moreover, when the edger is in its stowed position as shown in FIG. 1, the disk 30 is somewhat protected by the wheel.

Returning momentarily to FIG. 4 it will also be appreciated that the bulged out portion 13 of the mower deck 12 may well be generally coextensive with the outermost projection of the edging disk 31 so that as the mower is pushed along a surface S, cuttings or clippings generated by the disk will be sucked up by the advancing vacuum zone 58 generated by the mower beneath the deck and particularly beneath the bulged area 13. Moreover, where the mower 11 is a side discharge mower the edger will also be located on the same side of the mower 11 as the discharge chute. Accordingly, it is not believed that the disposition of the edger outwardly of the wheel 15 will seriously effect the close-in cutting capability of the mower, particularly where the mower is of the side discharge type.

From the foregoing it will also be appreciated that the particular construction provides a rigid, positive combination of elements providing a non-rotational or torque resistant outrigger mount for the edger. The axle 17 is keyed by means of the flats 21 and 22 to any height adjusting mechanism 20 or to the mower deck 12 and the axle is thereby prevented from turning. The positioning plate 48 is also prevented from turning and the arm-mounted edger disk can be rotated about the non-rotatable axle and positioning plate 48. The disk 30, of course, is free to rotate about its axis 36, particularly where the bolt 37 is provided with a bearing shoulder (not shown) on which the disk is rotationally mounted for cutting.

Also it will be appreciated that the various grooves 49 and the positioning plate 48 permit a positively indexed height adjustment of the edger disk for different edging depths and which adjustment is independent of the grass cutting height of the mower as noted above.

Moreover, it will be appreciated that the disk is generally disposed in the same common vertical plane whether in the stowed position as shown in FIG. 1 or the deployed position as shown in FIG. 2. For deployment it is only necessary to rotate the second shroud 33 to uncover the cutting edge of the disk and then to operate the adjusting arm 45 to lower the disk to the desired cutting depth.

It will also be appreciated that the mower can be operated on the pavement or on the turf surface as is required for any particular edging operation.

Finally, it should be understood that which is not apparent from the disclosure, the edger 10, in use does not significantly diminish the straight-line stability of the mower 11.

All these and other modifications and advantages will become readily apparent from the foregoing to one of ordinary skill in the art without departing from the scope of this invention and applicant intends to be bound only by the claims appended hereto.

We claim:
1. Turf edging apparatus including in combination
 a wheeled lawn care apparatus having a frame and a non-rotational front axle and a front wheel mounted thereon, said front wheel having a circumferential tread for rolling engagement with a surface over which the lawn care apparatus can be rolled,
 an edging disk having a turf cutting edge,
 arm means mounting said edging disk on said axle for selective movement about said axle, said disk having a disk axis, said disk axis being radially spaced from said axle and radially adjustable in a circular direction about said axle independently of said frame, said disk being rotatable about said disk axis, said disk being movable between a stowed position above said surface and a deployed edging position wherein said turf cutting edge is disposed beyond the circumferential tread of said front wheel from said axle for edging, wherein said lawn care apparatus comprises a lawnmower and further including means for adjusting the cutting height of said mower with respect to said front axle, and independently of the position of said disk, while maintaining constant the position of said disk with respect to the position of said axle, such that adjustment of the cutting height of said mower does not affect the edging position of said disk.

2. Turf edging apparatus as in claim 1 wherein said disk axis is disposed rearwardly of said axle with respect to said front wheel when said disk is in said stowed position, and below said axle when said disk is deployed in an edging position.

3. Turf edging apparatus including in combination:

a wheeled lawn care apparatus having a frame and a non-rotational front axle and a front wheel mounted thereon, said front wheel having a circumferential tread for rolling engagement with a surface over which the lawn care apparatus can be rolled, an edging disk having a turf cutting edge, arm means mounting said edging disk on said axle for selective movement about said axle, said disk having a disk axis, said disk axis being radially spaced from, and radially adjustable in a circular direction about, said axle, independently of said frame, said disk being rotatable about said disk axis, said disk being movable between a stowed position above said surface and a deployed edging position wherein said turf cutting edge is disposed beyond the circumferential tread of said front wheel from said axle for edging, wherein said turf cutting edge of said disk is circular, extends circumferentially around said disk and is sharpened, and said apparatus further includes:

a first shroud extending around an upper portion of said turf cutting edge, a second shroud extending around a lower portion of said turf cutting edge to shroud, together with said first shroud, the entire turf cutting edge when said disk is in a stowed position, and said second shroud being rotatable about said disk axis to a position adjacent said first shroud, when said disk is moved to its deployed edging position, to uncover a portion of said turf cutting edge for an edging operation.

4. Turf edging apparatus including in combination:

a wheeled lawn care apparatus having a frame and a non-rotational front axle and a front wheel mounted thereon, said front wheel having a circumferential tread for rolling engagement with a surface over which the lawn care apparatus can be rolled, an edging disk having a turf cutting edge, arm means mounting said edging disk on said axle for selective movement about said axle, said disk having a disk axis, said disk axis being radially spaced from, and radially adjustable in a circular direction about, said axle, independently of said frame, said disk being rotatable about said disk axis, said disk being movable between a stowed position above said surface and a deployed edging position wherein said turf cutting edge is disposed beyond the circumferential tread of said front wheel from said axle for edging, wherein said disk axis is radially movable to positively indexed positions about said wheel axle through at least 90°.

5. Turf edging apparatus including in combination:

a wheeled lawn care apparatus having a frame, at least one non-rotational front axle operably secured in said frame and a front wheel mounted thereon, said front wheel having a circumferential tread for rolling engagement with a surface over which the lawn care apparatus can be rolled, an edging disk having a disk axis parallel to said axle and having a turf cutting edge, arm means secured to said axle, and being rotatable about said axle and with respect thereto, said arm means mounting said edging disk on said axle for selective movement about said axle, said disk axis being radially spaced from, and radially adjustable in a circular direction about said axle, independently of said frame, said disk being rotatable about said disk axis, said disk being movable between a stowed position above said surface and a deployed edging position wherein said turf cutting edge is disposed beyond the circumferential tread of said front wheel from said axle for edging, wherein said turf cutting edge has a forward portion extending forwardly of said axle to a position proximate the forwardmost tread of said front wheel when said disk is deployed in an edging position.

6. Turf edging apparatus including in combination:

a wheeled lawn care apparatus having a frame and a non-rotational front axle and a front wheel mounted thereon, said front wheel having a circumferential tread for rolling engagement with a surface over which the lawn care apparatus can be rolled, an edging disk having a turf cutting edge, arm means mounting said edging disk on said axle for selective movement said axle, said disk having a disk axis, said disk axis being radially spaced from, and radially adjustable in a circular direction about, said axle, independently of same frame, said disk being rotatable about said disk axis, said disk being movable between a stowed position above said surface and a deployed edging position wherein said turf cutting edge is disposed beyond the circumferential tread of said front wheel from said axle for edging, wherein said lawn care apparatus is lawnmower generating a vacuum zone for sucking up clippings, said edging disk being disposed forwardly of said vacuum zone.

7. An edger comprising in combination wheel means, including a circumferential tread, for supporting said edger over a surface;

a non-rotatable axle on which said wheel means is rotatably mounted, an edging disk, and arm means mounting said edging disk on said axle, said arm means being rotatable about said axle with respect thereto, said disk having an axis spaced radially and parallel to said axle for movement around said axle between a stowed position above said surface and a deployed edging position operatively below said surface with said axis disposed beneath and generally vertically aligned with said axle and with a turf cutting edge of said disk disposed proximate the forwardmost circumferential tread of said front wheel.

* * * * *

UNITED STATES PATENT AND TRADEMARK OFFICE
CERTIFICATE OF CORRECTION

PATENT NO. : 4,852,658

DATED : August 1, 1989

INVENTOR(S) : Lloyd E. Wessel and Edward O. Wessel

It is certified that error appears in the above-identified patent and that said Letters Patent is hereby corrected as shown below:

Column 1, line 45, after "the" insert --adjustment--.

Column 8, line 48, after "movement" insert --about--.

Column 8, line 52, "same" should be --said--.

Signed and Sealed this

Twenty-fourth Day of July, 1990

Attest:

HARRY F. MANBECK, JR.

Attesting Officer

Commissioner of Patents and Trademarks